Jan. 11, 1949.   R. E. KINNEY ET AL   2,458,996
MANUFACTURE OF CARBON BLACK
Filed Feb. 11, 1946
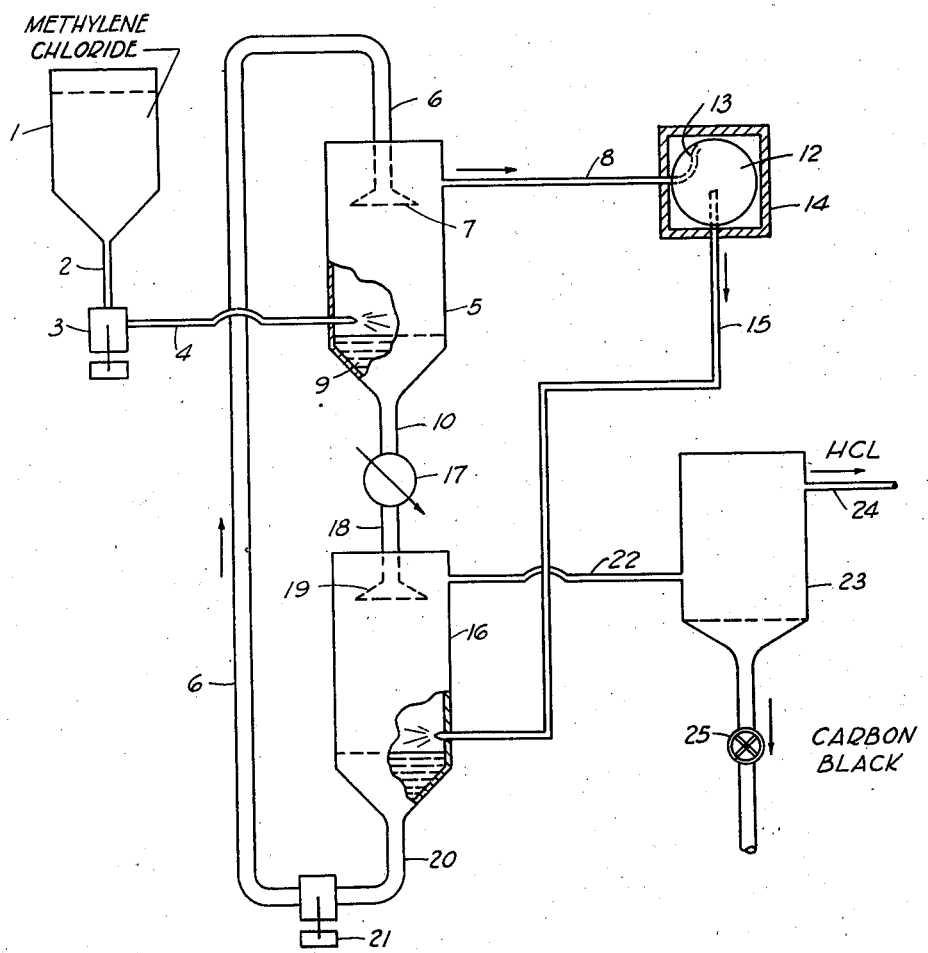
Robert E. Kinney
Everett Gorin
INVENTORS
BY John L. Sullivan
AGENT Patented Jan. 11, 1949

2,458,996

UNITED STATES PATENT OFFICE 2,458,996

MANUFACTURE OF CARBON BLACK

Robert E. Kinney and Everett Gorin, Dallas, Tex., assignors, by mesne assignments, to Socony-Vacuum Oil Company, Incorporated, New York, N. Y., a corporation of Texas Application February 11, 1946, Serial No. 646,842

4 Claims. (Cl. 23—209.4)

The invention relates to the production of carbon black by the pyrolysis of methylene chloride.

In processes for the chlorination of methane or natural gas, the product obtained ordinarily comprises a mixture of organic chlorides, such as methyl chloride, methylene chloride, chloroform, and carbon tetrachloride. Such a process, for example, is that disclosed in a copending application, Serial No. 507,618, filed October 25, 1943, by Everett Gorin, one of us, now Patent No. 2,407,828. The conditions employed in such processes may be adjusted so as to favor the formation of methylchloride in the product mixture or to provide for the increased formation of the higher chlorinated compounds such as chloroform or carbon tetrachloride, as desired. However, in either case considerable quantities of methylene chloride will be produced. Of the different chlorinated products obtained, methylene chloride is the one for which there is the least demand at present. Thus, methyl chloride is valuable as a refrigerant and is an important reactive intermediate for the production of many essential materials, such as benzene, toluene, acetylene, ethylene, etc., while chloroform and carbon tetrachloride are much in demand as solvent materials, etc.

It would be highly desirable from an economic standpoint in any chlorination process that the methylene chloride produced be utilized either for the production of some other more useful material or for the recovery of its valuable hydrogen chloride content. Recovery of the hydrogen chloride value of the methylene chloride would be highly advantageous economically in that it is utilizable for further hydrocarbon chlorination. Thus, in the process of the above mentioned application wherein natural gas is chlorinated by contacting with cupric chloride salt melt, the resulting cuprous chloride is rechlorinated by means of oxygen and hydrogen chloride. In this case, the recovered hydrogen chloride could be recycled to the oxy-chlorination unit of the process.

It is a prime object of this invention to provide a process for the economical utilization of methylene chloride. It is another object to provide an economical method for the production of premium grade, highly conducting carbon black from methylene chloride, such black being suitable for compounding with synthetic or natural rubber for the production of conducting rubber articles, such as truck tires, etc. Another object of the invention is to recover the hydrogen chloride value of methylene chloride. Other and further objects of the invention will become apparent from the following description thereof.

We have found that methylene chloride may be converted by pyrolysis to carbon black and hydrogen chloride in practically quantitative yield.

In accordance with our invention, substantially pure methylene chloride, separated by fractional distillation of the halogenated product mixture obtained in a hydrocarbon chlorination process, is pyrolyzed at a temperature of from 900° to 1200° C. to produce a mixture of carbon black and hydrogen chloride. The product gases are cooled, and the carbon black and hydrogen chloride are separated and recovered.

In general, contact times of at least 0.1 to 0.2 second should be employed when pyrolyzing methylene chloride in the above temperature range to insure its complete decomposition to carbon and hydrogen chloride. As a matter of fact, contact times considerably longer than this are desirable, particularly when operating in the lower portion of this temperature range. However, when operating in the upper portion of this temperature range, i. e., at 1100°–1200° C., somewhat shorter contact times may be employed. Contact times considerably longer than 0.1 to 0.2 second and up to the order of several minutes may be employed, under which conditions a black of high purity and superior electrical conductivity is produced. The term "contact time," as specified herein, is defined as the reciprocal space velocity, i. e., the volume of the reaction zone divided by the volume of methylene chloride vapor feed per second, reduced to standard conditions of temperature and pressure.

A full understanding of our invention may be obtained by reference to the accompanying drawing which diagrammatically illustrates a form of apparatus suitable for conducting the process thereof.

Referring to the drawing, reactant feed stock, essentially comprising methylene chloride, is withdrawn from storage reservoir 1 through line 2 and is pumped, by means of pump 3 by way of line 4, to a preheating vessel 5 wherein it is immediately vaporized. The reactant vapors rise through vessel 5 and are contacted by a countercurrent spray of hot molten salt which enters the vessel from line 6 through spray head 7. The reactant vapors attain a temperature of from about 300° to about 600° C. before leaving the top of vessel 5 through line 8. The salt melt 9, which is substantially cooled by the contacting with the reactant stream, settles to the bottom of the vessel and is withdrawn therefrom in line 10.

Salt melts suitable for use in our process may consist of any one of a number of low melting eutectic mixtures of halides, such as KCl-CuCl, CuCl-PbCl₂, etc., which do not catalyze the decomposition of methylene chloride. The preheated reactant vapors withdrawing from vessel 5 in line 8 are directed to pyrolysis zone 12.

The decomposition of methylene chloride is highly exothermic and, therefore, if rapid heat transfer in situ between the product gases and the reactant vapors is established, it is unnecessary to supply any external heating to the reaction once started, except the preheating to from 300° to 600° C. as above designated, in order to attain pyrolysis temperatures of 1000° C. or higher. It is, therefore, desirable to effect the pyrolysis in a reactor where the reactant gases may be subjected to violent turbulence, thereby insuring rapid heat transfer between input and effluent gases in situ. As shown in the drawing, the preheated gases enter the reactor 12, which is preferably spherical in shape, from line 8 through nozzle 13, which is directed tangentially along the reactor wall to produce a violent swirling motion of the gases inside the reactor. The exothermic heat evolved in the reaction raises the temperature in the reaction zone to the order of 900° to 1200° C. The reactor is insulated by a suitable jacket 14 which is embedded with electric heater coils for the purpose of supplying any necessary heat to the reaction, such as in the initial stages.

As stated hereinabove, contact times for the pyrolysis reaction should be sufficiently long to decompose substantially all of the methylene chloride fed to the reaction zone. For example, at temperatures of from 1000° to 1100° C., which is our preferred range, contact times greater than 0.1 to 0.2 second are sufficient to effect nearly quantitative decomposition of the methylene chloride feed. As previously stated, contact times considerably longer than that required to completely decompose the methylene chloride may be used if it is desired to produce a black of high electrical conductivity. Also the longer contact times will substantially eliminate any chlorine impurity from the carbon black product. Such effectively long contact times may be readily attained by sending the pyrolysis products from the pyrolysis zone to a separate, insulated soaking chamber (not shown) of considerably greater volume. The soaking chamber may be conveniently maintained at a temperature of the order of 100° C. lower than the temperature of the reactor 12.

Referring back to the drawing, the pyrolysis product mixture comprising a suspension of carbon black in hydrogen chloride and small amounts of unconverted methylene chloride are withdrawn from the pyrolysis reactor in line 15. In line 15 the product stream is directed to a quenching vessel 16, where they are cooled by countercurrent contacting with a spray of relatively cool salt melt deriving from the preheating zone 5. The relatively cool melt from preheater 5 is preferably passed to a cooler 17, where it is further cooled to a degree necessary to provide for efficient cooling of the reaction gases in vessel 16. From cooler 17 the melt is withdrawn by way of line 18 and enters at the top of vessel 16 through spray head 19. The product stream is cooled by the melt spray to a temperature of the order of 300° C. At the same time the heat transferred to the melt will raise its temperature substantially to that required for preheating the reactant stream in preheater 5. The heated melt settles in vessel 16 and is withdrawn in line 20 to be pumped back to preheating vessel 5 by way of line 6, having a pump 21. It may be necessary to add some external heat to the melt before it returns to vessel 5, depending upon the extent to which it is desired to cool the product mixture prior to separating the carbon black therefrom. It will be appreciated that by closely controlling the heat transfer in quenching zone 16 and preheating zone 5, a highly efficient utilization of the heat of reaction may be provided for, so that the process is substantially thermally self-sufficient.

The cooled product gases are withdrawn from quenching vessel 16 in line 22 and are directed to chamber 23, which contains filters or other suitable means (not shown) for separating the carbon black product from the hydrogen chloride. The hydrogen chloride gas is withdrawn from chamber 23 through line 24. The carbon black product is retained and collected in chamber 23 from which it may be withdrawn from time to time by way of valve 25.

To illustrate the type of results obtainable by our process, the following examples are presented.

Example I 341 grams of methylene chloride were pyrolyzed at 1000° C. and 0.2 second contact time in a quartz reactor. The carbon black product was collected by passing the reactor effluent into water and filtering. The hydrogen chloride gas formed was determined by titration of the filter water. A total of 46.6 grams of carbon black and 287.0 grams of hydrogen chloride were produced. An electron micrograph of the product black showed the average particle size of the black to be 46.5 m$\mu$, while a measurement of the electrical resistivity of the black gave a value of 1.42 ohm cm. The latter value was obtained while the carbon black sample was under a pressure of 720 lbs./in.²

Example II

In this experiment methylene chloride was pyrolyzed under the same conditions as in Example I, except that the carbon black product was given an additional residence time of several minutes in a soaking chamber maintained at a temperature approximately 100° lower than the main pyrolysis zone. The methylene chloride was substantially completely decomposed into carbon black and hydrogen chloride. Tests on the product black showed it to have an average particle size of 43.0 m$\mu$ and a resistivity of 0.29 ohm cm. at 720 lbs./in.². The particle size and electrical resistivity of a typical commercial acetylene black were measured and found to be 49.0 m$\mu$ and 0.37 ohm cm., respectively. The properties of the methylene chloride black are therefore similar to those of the highest grade of commercial blacks produced from acetylene.

Example III

In this experiment methylene chloride was pyrolyzed at 600° C. for a contact time of 3 minutes. Although better than 90% of the methylene chloride was converted to carbon black and hydrogen chloride, the particle size of the black was so large that its size was outside the range required in commercial blacks. This illustrates the necessity of carrying out the pyrolysis at the higher temperatures disclosed hereinabove if a premium black is to be obtained.

Although we have described our invention particularly with reference to the pyrolysis of methylene chloride, it should be understood that the methylene chloride feed need not be pure but may be contaminated with minor amounts of impurities, particularly those formed in a natural gas chlorination operation that would be impracticable to separate completely from the methylene chloride. Small amounts of unconverted hydrocarbons and other chlorinated hydrocarbons, for example, are the most likely impurities. The amount of these impurities should not exceed about 10%, however, and the amount of other chlorinated hydrocarbons should be less than about 5%. Further, it will be evident to those skilled in the art that, although we have described the use of salt melts as heat transfer agents in utilizing the heat of reaction to preheat the feed gas stream, use of such heat transfer agents does not constitute a limitation on our invention, but the principle of the invention extends to the use of any heat exchange arrangement.

Having now fully described our invention and the manner of operation thereof, what we claim as new and useful and wish to protect by Letters Patent is:

1. A process for the preparation of carbon black from methylene chloride which comprises the steps of (1) passing said methylene chloride in direct contact with a molten salt in a preheating zone, whereby it is vaporized and heated to a temperature of from about 300° to about 600° C., (2) separately withdrawing the hot vaporized reactant and the molten salt from the preheating zone, (3) passing the reactant vapors to a pyrolysis zone wherein they are subjected to a temperature of from about 900° to about 1200° C. to form carbon black and hydrogen chloride, (4) withdrawing the product mixture from the pyrolysis zone, (5) cooling said mixture by directly contacting it with the molten salt withdrawn from the preheating zone in step 2, (6) recovering carbon black product from said mixture, and recycling the molten salt to said preheating zone.

2. The process of claim 1 wherein the temperature of pyrolysis of the reactant vapors to form carbon black and hydrogen chloride is between about 1000° and 1100° C.

3. A continuous process of high thermal efficiency for the production of carbon black and hydrogen chloride from methylene chloride which comprises the steps of (1) passing methylene chloride to a preheating zone where it is directly contacted with a hot salt melt to vaporize and preheat the methylene chloride reactant to a temperature of from about 300° to about 600° C., (2) feeding the preheated reactant vapors from step 1 to a pyrolysis zone wherein they are subjected to a temperature of from about 900° to about 1200° C., the available heat in said pyrolysis zone deriving from the heat evolved in the pyrolysis reaction after the reaction is initiated, (3) withdrawing a pyrolysis product stream comprising a suspension of carbon black in hydrogen chloride from the pyrolysis zone, (4) passing the product stream to a cooling zone where it is directly contacted with a relatively cool salt melt derived from the preheating zone of step 1, whereby the product stream is cooled and the melt is reheated, (5) returning the melt from step 4 to step 1 for use as the hot salt melt of step 1, (6) withdrawing the cooled product stream from step 4, and (7) separating and recovering carbon black and hydrogen chloride from said product stream.

4. A process for the preparation of carbon black from methylene chloride which comprises passing the methylene chloride reactant in direct contact with a molten salt in a preheating zone wherein the methylene chloride is vaporized and heated to a temperature of from about 300° to about 600° C., withdrawing the molten salt from the preheating zone, circulating the reactant vapors from the preheating zone to a pyrolysis zone wherein said vapors are subjected to a temperature of from about 900° to about 1200° C. for a period of time between 0.1 second and 3 minutes to form a mixture comprising carbon black and hydrogen chloride, withdrawing the product mixture from the pyrolysis zone, cooling said mixture by directly contacting it with the molten salt withdrawn from the preheating zone, separating and recovering the hydrogen chloride and carbon black from said mixture, and recycling the molten salt to said preheating zone.

ROBERT E. KINNEY.
EVERETT GORIN.

REFERENCES CITED

The following references are of record in the file of this patent:

UNITED STATES PATENTS

| Number | Name | Date |
|---|---|---|
| 1,259,121 | Mott | Mar. 12, 1918 |
| 1,725,359 | Lederer | Aug. 20, 1929 |
| 2,368,828 | Hanson et al. | Feb. 6, 1945 |
| 2,375,795 | Krejci | May 15, 1945 |
| 2,403,735 | Mason et al. | July 9, 1946 |